United States Patent
Hale et al.

(10) Patent No.: US 12,506,709 B2
(45) Date of Patent: Dec. 23, 2025

(54) METHOD AND SYSTEM FOR MANAGING TRAFFIC PACKETS

(71) Applicant: Lockheed Martin Corporation, Bethesda, MD (US)

(72) Inventors: Robert W. Hale, Montclair, VA (US); Kyle Alan Borowski, Louisville, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 120 days.

(21) Appl. No.: 18/522,755

(22) Filed: Nov. 29, 2023

(65) Prior Publication Data
US 2024/0179122 A1    May 30, 2024

Related U.S. Application Data

(60) Provisional application No. 63/429,020, filed on Nov. 30, 2022.

(51) Int. Cl.
*H04L 9/40*   (2022.01)

(52) U.S. Cl.
CPC .............. *H04L 63/0236* (2013.01)

(58) Field of Classification Search
CPC .................................. H04L 63/0236
See application file for complete search history.

(56) References Cited

U.S. PATENT DOCUMENTS

| | | | | |
|---|---|---|---|---|
| 6,725,056 B1 * | 4/2004 | Moles | ............... | H04W 8/265 455/524 |
| 8,612,612 B1 * | 12/2013 | Dukes | ............... | H04L 67/141 709/203 |
| 8,621,599 B2 * | 12/2013 | King | ............... | H04L 63/0428 726/14 |

(Continued)

FOREIGN PATENT DOCUMENTS

| | | |
|---|---|---|
| CN | 103561361 A | 2/2014 |
| CN | 106533544 A | 3/2017 |

(Continued)

OTHER PUBLICATIONS

International Search Report and Written Opinion corresponding to PCT Patent Application No. PCT/US2023/081579 dated May 12, 2025, 14 pages.

*Primary Examiner* — Aravind K Moorthy
(74) *Attorney, Agent, or Firm* — Baker Botts L.L.P.

(57) ABSTRACT

Embodiments provide a system for managing traffic packets of application components. The system includes a security controller. The security controller may be coupled to a plurality of application components. The security controller includes one or more memories and a plurality of processors. The one or more memories are operable to store a set of application components features of each application component of the plurality of application components. The processors may be coupled with the memories and a processor may be configured to perform one or more steps. The processor receives traffic packets from a set of the plurality (Continued)

of application components coupled to the security controller. The processor receives traffic packets from a set of the plurality of application components coupled to the security controller.

17 Claims, 7 Drawing Sheets

(56) References Cited

U.S. PATENT DOCUMENTS

| | | | |
|---|---|---|---|
| 8,675,488 B1* | 3/2014 | Sidebottom | H04L 67/141 370/235 |
| 8,756,417 B1 | 6/2014 | Gardner | |
| 9,252,972 B1* | 2/2016 | Dukes | H04L 49/70 |
| 9,641,176 B2 | 5/2017 | Hammond et al. | |
| 9,971,910 B2 | 5/2018 | Kling et al. | |
| 10,528,765 B2 | 1/2020 | Smith et al. | |
| 10,606,764 B1 | 3/2020 | Kravit et al. | |
| 10,614,231 B1 | 4/2020 | Dozer et al. | |
| 11,159,560 B1* | 10/2021 | Limb | G06N 3/04 |
| 11,264,991 B2 | 3/2022 | Lukefahr et al. | |
| 11,477,165 B1* | 10/2022 | McDowall | H04W 12/30 |
| 11,895,015 B1* | 2/2024 | Budhia | H04L 45/566 |
| 12,095,666 B1* | 9/2024 | Goodell | H04L 45/04 |
| 12,200,130 B1* | 1/2025 | Satpathy | G06F 21/52 |
| 2006/0146879 A1* | 7/2006 | Anthias | H04L 69/329 370/471 |
| 2008/0291923 A1* | 11/2008 | Back | H04L 45/04 370/396 |
| 2013/0268729 A1* | 10/2013 | Manhas | H04L 63/0263 711/108 |
| 2014/0289426 A1* | 9/2014 | Chan | H04L 67/10 709/247 |
| 2014/0289856 A1* | 9/2014 | Jiang | G06F 21/552 726/23 |
| 2015/0006435 A1* | 1/2015 | Konchitchki | G06Q 40/06 705/36 R |
| 2016/0294874 A1* | 10/2016 | Sun | H04L 63/20 |
| 2017/0266955 A1* | 9/2017 | Harada | H04N 23/687 |
| 2017/0302626 A1 | 10/2017 | Yan | |
| 2017/0318035 A1* | 11/2017 | Baughman | G06N 3/044 |
| 2018/0048562 A1 | 2/2018 | Meyer | |
| 2018/0115611 A1* | 4/2018 | Lear | H04L 41/28 |
| 2018/0123952 A1* | 5/2018 | Link | H04L 69/22 |
| 2018/0227229 A1* | 8/2018 | Lopez | H04L 45/28 |
| 2019/0050273 A1* | 2/2019 | Tamir | G06F 9/4411 |
| 2019/0104065 A1* | 4/2019 | Sharma | H04L 49/35 |
| 2019/0155777 A1* | 5/2019 | Shim | G06F 13/4068 |
| 2019/0356697 A1* | 11/2019 | Chougule | G06F 9/45558 |
| 2020/0274887 A1* | 8/2020 | Zaw | H04L 63/1441 |
| 2020/0336457 A1* | 10/2020 | Sharma | H04L 63/02 |
| 2021/0006543 A1* | 1/2021 | Deshpande | H04L 63/20 |
| 2021/0089685 A1 | 3/2021 | Cheruvu et al. | |
| 2021/0099429 A1* | 4/2021 | Landriot | H04L 63/0263 |
| 2021/0185059 A1* | 6/2021 | Achleitner | G06F 16/355 |
| 2021/0203600 A1* | 7/2021 | Abilay | H04L 45/64 |
| 2021/0203688 A1* | 7/2021 | Ghule | H04L 63/1425 |
| 2021/0226936 A1* | 7/2021 | Nguyen | H04L 63/0428 |
| 2022/0038940 A1* | 2/2022 | Kotecha | H04L 43/0876 |
| 2022/0131804 A1* | 4/2022 | Kimura | H04L 45/24 |
| 2022/0200924 A1* | 6/2022 | Lu | H04B 7/0452 |
| 2022/0377008 A1 | 11/2022 | J S | |
| 2022/0385635 A1* | 12/2022 | Thimmisetty | G06F 18/23 |
| 2022/0400077 A1* | 12/2022 | Ekawde | H04L 67/10 |
| 2022/0400408 A1* | 12/2022 | Yashwant Sawant | H04W 28/10 |
| 2023/0095442 A1* | 3/2023 | Miriyala | H04L 41/0853 709/220 |
| 2023/0144568 A1* | 5/2023 | Means | H04L 45/04 709/238 |
| 2023/0224206 A1* | 7/2023 | Rahman | H04L 43/0894 370/218 |
| 2023/0291797 A1* | 9/2023 | Chang | H04L 69/22 |
| 2023/0370306 A1* | 11/2023 | Horton | G06F 9/45558 |
| 2023/0370378 A1* | 11/2023 | Horton | H04L 45/76 |
| 2023/0376615 A1* | 11/2023 | Verma | H04L 63/0263 |
| 2024/0069949 A1* | 2/2024 | Ueda | H04L 45/745 |
| 2024/0078139 A1* | 3/2024 | Zeighami | G06F 11/3062 |
| 2024/0098030 A1* | 3/2024 | Narahari | H04L 43/028 |
| 2024/0098118 A1* | 3/2024 | Kaznocha | H04L 63/205 |
| 2024/0113979 A1* | 4/2024 | Sang | H04L 47/2475 |
| 2024/0163161 A1* | 5/2024 | Jose | H04L 41/20 |

FOREIGN PATENT DOCUMENTS

| | | |
|---|---|---|
| CN | 108768669 A | 11/2018 |
| CN | 109039591 A | 12/2018 |
| CN | 110086752 A | 8/2019 |
| CN | 111901363 A | 11/2020 |
| CN | 111914267 A | 11/2020 |
| CN | 212112464 U | 12/2020 |
| CN | 112422416 A | 2/2021 |
| WO | 2020178089 A1 | 9/2020 |
| WO | 2021197182 A1 | 10/2021 |

* cited by examiner

METHOD AND SYSTEM FOR MANAGING TRAFFIC PACKETS

TECHNICAL FIELD

This disclosure generally relates to an embedded hardware security controller, and more specifically to a hardware security controller (HSC) and a software security controller (SSC).

BACKGROUND

Cyber security systems include a number of security software and hardware solutions that are designed to provide risk mitigation in traditional informational technology (IT) architectures and systems. As containerization and virtualization become more standard and as platforms become smaller and more compact, there is a need to provide security functions collectively. Existing systems perform security functions individually as opposed to an integrated and secure solution.

DETAILED DESCRIPTION

Overview

Figure 1:
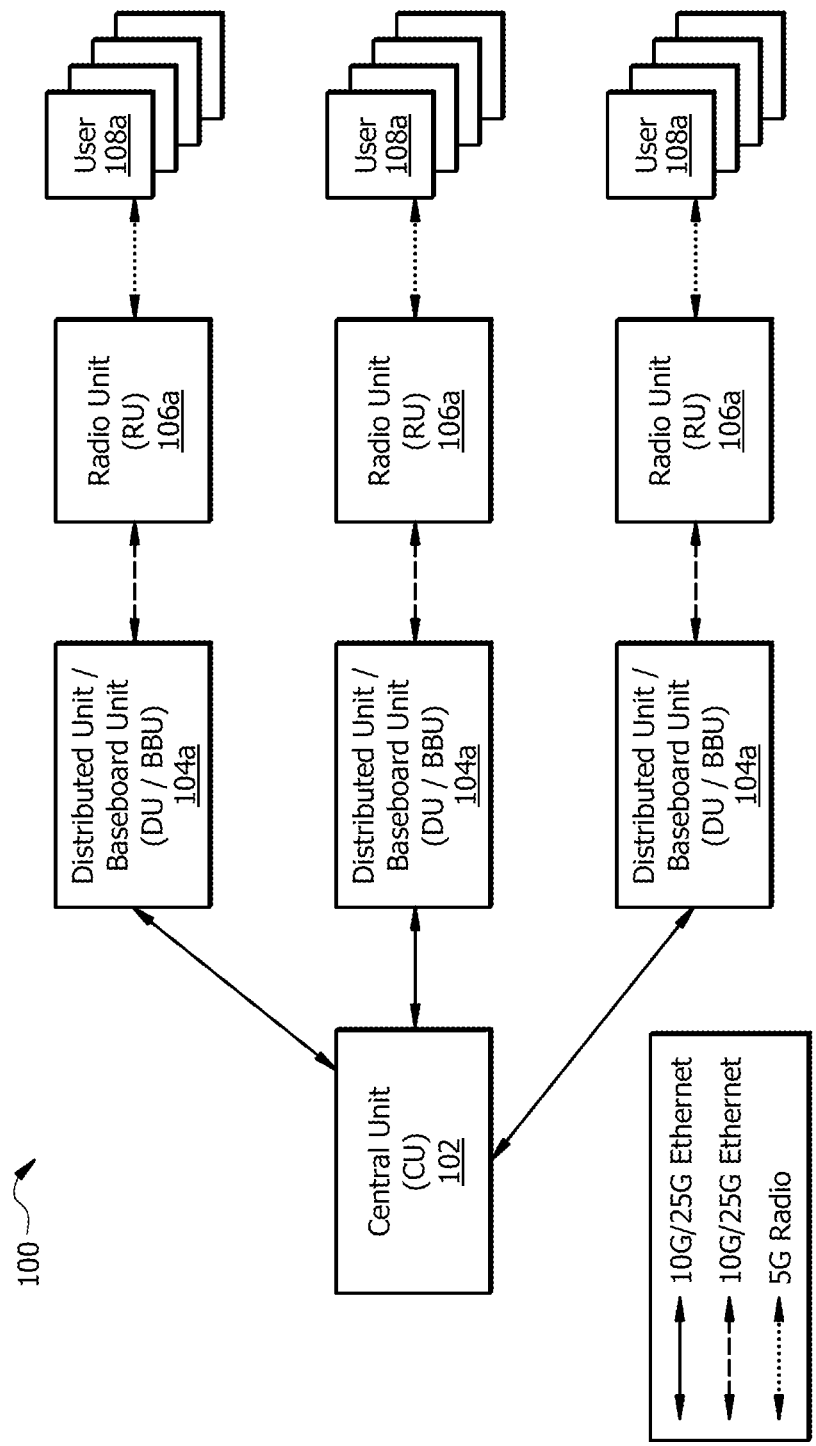
FIG. 1 illustrates an example illustrating an overview of an HSC in a system of logical board components connected over a PCIe bus connection, according to an embodiment.

Embodiments of the present disclosure relate to a system for managing traffic packets of application components. The system includes a security controller. The security controller may be configured as a single board chip in a field programmable gate array (FPGA) system. The security controller may be coupled to a plurality of application components. The security controller includes one or more memories and a plurality of processors. The one or more memories operable to store a set of application components features of each application component of the plurality of application components. The plurality of processors operably coupled with the one or more memories and a processor may be configured to perform one or more steps. The processor may be configured to receive traffic packets from a set of the plurality of application components coupled to the security controller. The processor may be configured to receive traffic packets from a set of the plurality of application components coupled to the security controller. The processor may be configured to inspect the traffic packets of the set of the plurality of application components to determine an application component feature of each of the application components in the set of the plurality of application components. The processor may be configured to compare the application component feature of each of the application components with the set of application components features. The processor may be configured to perform one or more operations to manage the traffic packets of each of the set of the plurality of application components based on comparing the application component feature of each of the set of the plurality of application components with the set of application components features.

Embodiments of the present disclosure relate to a computer-implemented method executed by a system configured with a security controller for managing traffic packets of application components. In an embodiment, the method may implement functions or operations of the system described for managing traffic packets of application components. The method includes receiving, by a processor of a security controller of the system, traffic packets from a set of a plurality of application components coupled to the security controller. The security controller may be configured in a field programmable gate array (FPGA) system. The security controller may be coupled to a plurality of application components. The security controller includes one or more memory operable to store a set of application components features of each application component of the plurality of application components. The method includes inspecting, by the processor, the traffic packets of the set of plurality of application components to determine an application component feature of each of the application components in the set of plurality of application components. The method includes comparing, by the processor, the application component feature of each of the application components with the set of application components features. The method includes performing, by the processor, one or more operations to manage the traffic packets of each of the set of plurality of application components based on comparing the application component feature of each of the set of plurality of application components with the set of application components features.

Embodiments of the present disclosure relate to a non-transitory computer-readable medium storing instructions that when executed by a processor cause the processor to perform one or more steps. The processor may be configured to receive traffic packets from a set of plurality of application components coupled to a security controller. The security controller may be configured in a field programmable gate array (FPGA) system. The security controller may be coupled to a plurality of application components. The security controller includes one or more memory operable to store a set of application components features of each application component of the plurality of application components. The processor may be configured to inspect the traffic packets of the set of the plurality of application components to determine an application component feature of each of the application components in the set of the plurality of application components. The processor may be configured to compare the application component feature of each of the plurality of application components with the set of application components features. The processor may be configured to perform one or more operations to manage the traffic packets of each of the set of the plurality of application components based on comparing the application component feature of each of the set of the plurality of application components with the set of application components features.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Embodiments of the present disclosure provide security protection for devices. In an embodiment, cybersecurity systems include a number of security software and hardware solutions that may be designed to provide risk mitigation in information technology (IT) architectures and systems. Embodiments provide containerization and virtualization allowing computation systems and platforms to be smaller and more compact than traditional systems. Embodiments provide security functions, including but not limited to, application and process whitelisting, basic input output system (BIOS), operating systems (OS), hypervisor, container image validation and authorization, intrusion and/or anomaly detection and prevention, live memory analysis, communications security, device configuration, device monitoring, and traffic packets encryption. The security functions may be provided individually in the existing solution as opposed to an integrated and secure solution.

Embodiments of the present disclosure provide a security controller to manage traffic packets of different devices, boards, peripheral controller interconnect express (PCIe) connected devices, computing devices, application components, and systems that may run and implement different application-specific protocols and functions. As used herein, processor may be any processor, such as, for example, a field programmable gate array (FPGA), Application Specific Integrated Circuit (ASIC), Reduced Instruction Set Computing (RISC), Advanced Risc Machine (ARM), one or more general purpose processors, a general purpose processor operably coupled to a FPGA, or any combination thereof. The security controller may be configured in processor such as, for example, one or more FPGA, ASIC, RISC, ARM, or general purpose processor or processors. The security controller may be configured to inspect traffic packets received from a set of application components to determine device or system features of each of the devices/systems or components. The device or system features may be compared with features of devices or systems stored in an inventory of manifest of different devices or systems. Based on the comparison, operations may be performed to manage the traffic packets by performing functions including, but not limited to, any of routing the traffic packets, re-routing the traffic packets, selecting the traffic packets, and deselecting the traffic packets for execution on a corresponding operative environment. In one example, the device or system feature comparison with the inventory of the device or systems manifests determines compatibility of the device or system feature, and routes and/or authorizes the traffic packets of that device or system to a trusted operating environment. For example, a computing device transmits traffic packets to audio boards in a way that tampers the operating environment of the audio boards when the traffic packets may be determined to be associated with video graphics. In order to manage the malicious action of attempting to tamper the audio boards may be rerouted to an operating environment of video boards instead of audio boards. In this way, the devices and systems may be securely protected for trusted operating environments. In an embodiment, a routing table may be maintained and updated based on performing the one or more operations to manage the traffic packets of the devices or systems. The one or more operations to manage the traffic packets of the devices or systems may be performed by implementing one or more decision-making functions which may include, but are not limited to, trusted operating environment validation and monitoring; application and process whitelisting for various operating environments external to the operating environment of the platform of the HSC; encryption services for data-at-rest and data-in-transit (including quantum-resistant algorithms); intrusion/anomaly detection and prevention (rule-based and machine learning (ML)/artificial intelligence (AI)-based); integration with security incident and event monitoring (SIEM) systems; and trusted switching of the traffic packets of the devices.

Embodiments of the present disclosure provide an embedded hardware security controller (HSC) FPGA (Versal). In one example, the embodiments use 5th Generation (5G) communications networks. The HSC may be a package of security functions provided in an FPGA of a dedicated single-board computer, PCIe card, or other hardware form factor. The HSC may be designed to utilize an off-HSC trust factor, for example, a trusted processor or a trusted platform module, and/or an on-board root of trust as the foundation for securing an operating environment, in which the HSC may be deployed. The on-board root of trust includes a trusted bitstream to program the FPGA, a cryptographic seed and true random number generator (TRNG) provided within the FPGA fabric and/or a trusted internet protocol (IP) core, and an ongoing inventory and validation of several key device configuration parameters, such as device identification (ID), media access control (MAC) address, physical connection address, etc. The HSC provides a number of modules, which may be implemented depending on protection level and mitigations required for the particular platform into which the HSC is integrated. These modules include, but are not limited to, 1) trusted operating environment validation and monitoring; 2) application and process whitelisting for various operating environments external to the operating environment of the platform; 3) encryption services for data-at-rest and data-in-transit (including quantum-resistant algorithms); 4) intrusion/anomaly detection and prevention (rule-based and ML/AI-based); 5) integration with security incident and event monitoring (SIEM) systems; and 6) trusted switching. In an embodiment, the HSC platform in the FPGA system may be configured to allow the development and deployment of additional security modules as needed to ensure future compatibility.

Embodiments of the present disclosure may provide solutions for computer-automated terminal operation system (CATOS) work. For example, embodiments may provide a solution to extend the architectural concept defined as the master/slave relationship and break it into a hardware-focused platform for trusted switching, and communication security that may be designed to support 5G transmission speeds. Embodiments may provide a solution for a software security controller (SSC) that may be running in a dedicated embedded processor connected to the FPGA in a system-on-chip (SoC)-style configuration. In some embodiments, while the solution provided in this disclosure is related to a primary deployment model, the architecture of utilizing the security controller as HSC/SSC for the FPGA system may be supported in multi-core central processing units (CPUs) where a dedicated microvisor may be employed to instantiate the SSC in one or more dedicated cores in a host CPU. Embodiments may provide a solution that supports data protection and transmission at 5G rates.

Embodiments may provide a solution that may be employed on a number of FPGAS, SoCs, custom single-board computers, multi-core CPUs, and other hardware, thereby allowing for the widest possible use of the technology. Embodiments may provide a solution that incorporates secure remote direct memory access and in-line encryption. Embodiments may provide a solution that may utilize a modular approach to deploy a new security technology or to evolve current security technologies. The modular approach enables the modules to be individually updated and deployed, rather than having to completely deploy a new piece of hardware.

The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates an example illustrating an overview of an HSC 100 in a system of logical board components connected over a PCIe bus connection. In some scenarios, existing systems use the core 5G technology, which includes processors/FPGAs connected with PCIe bus connection and 10G/25G/40G/100G interfaces that use off-the-shelf (OTS) development kits and personal computers (PCs) for the initial development of a security detection. Use of other communications networks, e.g., 6th Generation (6G), Long Term Evolution (LTE), and the like, in addition to, or in place of the 5G network, is also possible. Also, Existing interfaces/FPGAs may not be deployed into overload test set virtual path cross-connect (OTS VPX) boards. Embodiments provide the HSC 100 depicts standard transmission interfaces between application components, for example, 5G logical components, according to particular embodiments. In an embodiment, the HSC 100 may be inserted in one or more (e.g., all) portions of communications networks (e.g., 5G networks). The HSC 100 includes central unit (CU) 102, distributed units or baseband units (DU/BBU) 104a-104c (104a, 104b, 104c), radio unit (RU) 106a-106c (106a, 106b, 106c), user computing devices 108a-108c (108a, 108b, 108c). In an embodiment, 5G RUs 106a-106c and associated based stations may be housed in use for 5G radio frequency (RF) transmissions between the user computing devices 108a-108c and the RU 106a-106c. The system in which the HSC 100 may be configured, uses 20G/25G Ethernet transmissions between the RU 106a-106c and the distributed unit/baseband unit 104a-104b. The system of the HSC 100 may utilize 10G/25G Ethernet connections between the central unit 102 and the distributed unit/baseband unit 104a-104c. In an embodiment, the HSC 100 includes 10G/25G/40G/100G interfaces, which may be used in between any of the communications paths between the user computing devices 108a-108c and the central unit 102. In an embodiment, the HSC 100 may be used between the central unit 102 and any network storage/systems (not depicted).

Figure 2:
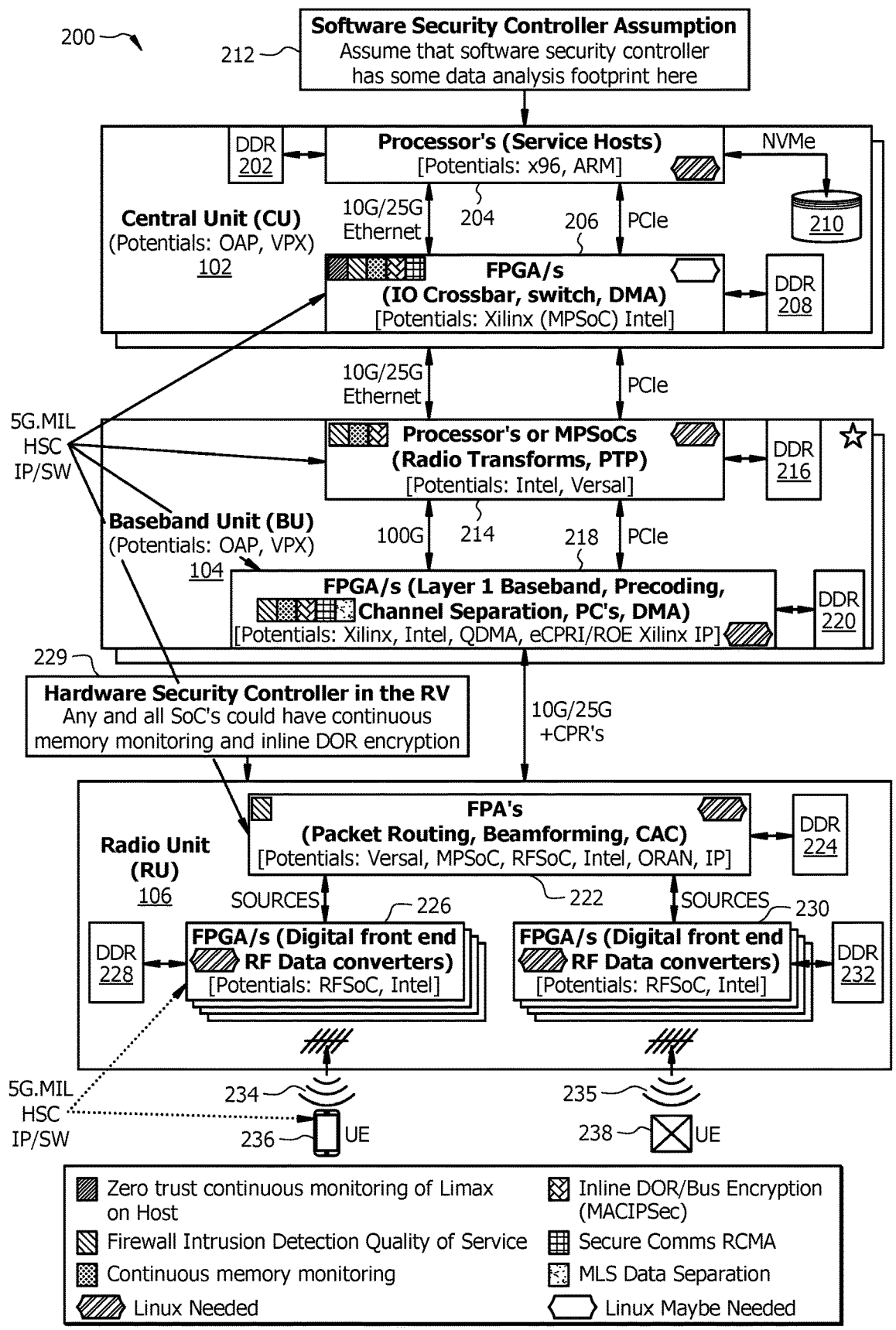
FIG. 2 is an example illustrating a notional architecture of an HSC, according to particular embodiments.

FIG. 2 is an example illustrating a notional architecture of HSC 200, according to particular embodiments. The HSC 200 architecture may be an IP core in any FPGA system or FPGA device or FPGA board or component that may be connected over the PCIe bus connection. For example, the HSC 200 architecture may include the central unit 102, the baseband unit 104 and radio unit 106. In an embodiment, the central unit 102 may be configured with any of on-chip arbitration protocol (OAP), VPX boards and combination thereof to detect traffic packets and feature of application components associated with the traffic packets to perform one or more operations via determining any of decision-making modules and/or combination of the decision-making modules which may be described later in sections herein. The central unit 102 may be configured with one or more processors 204 with a Linux kernel. In an embodiment, the one or more processors 204 may include, but are not limited to, x86 processors and advanced RISC (reduced instruction set computer) machines (ARM) processors. In an embodiment, the central unit 102 may be configured with software security controller (SSC) assumption indicated as 212 that may implement the central unit 102 as service host to implement data analysis footprint for analyzing the traffic packets received over the Ethernet connections and/or PCIe bus connection. The one or more processors 204 may act as service hosts and may be communicatively connected to database/random access memory (RAM)/flash/double data rate (DDR) memory 210 and FPGAs 206 over the PCIe bus connection and/or Ethernet connection with 10G/25G speed. In some embodiments, the one or more processors 204 may be communicatively connected to the FPGAS 206 via one or more links including, but not limited to, a network interface controller (NIC) or network adapter for communicating with an Ethernet or other wire-based network or a wireless NIC (WNIC) or wireless adapter for communicating with a wireless network, such as a WI-FI network, a personal area network (PAN), a local area network (LAN), a wide area network (WAN), a metropolitan area network (MAN), or one or more portions of the Internet or a combination of two or more of these, a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. In an embodiment, the FPGAs 206 may include configurations of input/output (I/O) Crossbar, switch modules and direct memory access (DMA) modules. For example, the FPGAs

206 may include Xilinx (multiprocessor system-on-chip (MPSoC)) and Intel processing FPGAs. The FPGAs 206 may be communicatively connected to DDR 208.

In an embodiment, the DDR 208 and database 210 may be programmatically configured to manifest and store inventories of various application components, devices, boards, components, units, and other systems running its own application and protocol. In an embodiment, various application components, devices, boards, components, units, and other systems may be running its own hardware, software, device drivers, applications, and protocols, and may be collectively referred as application components that may be connected to the one or more processors 204 and FPGAs 206. The DDR 208 and database 210 may be configured to store inventories of set of application components, for example, device identifier (ID), device name, type of application component associated with the device, functioning protocol of the application component, IP address of each application component, compatibility data/feature of the application component, executable instructions, information about trusted operative environment of each of the application components and other data related to operational and functionality of the application components that may be related to provide trusted operating environment, compatibility and functioning/operative protocol of the application components. In an embodiment, the central unit 102 may be configured to programmatically various decision-making modules which may include, but are not limited to, (a) trusted operating environment validation and monitoring module, (b) application and process whitelisting for various operating environments external to the operating environment of the platform module, (c) intrusion/anomaly detection and prevention (rule-based and machine learning (ML)/artificial intelligence (AI)-based) module, (d) encryption services for data-at-rest and data-in-transit (including quantum-resistant algorithms) module, (e) integration with security incident and event monitoring (SIEM) systems module and (f) trusted switching module. In an embodiment, one or combination of the decision-making modules may be detected and implemented based on the traffic packets received over PCIe bus connection when analyzed to determine compatibility feature/data of the associated application components (from and/or for which the traffic packets correspond to). In an embodiment, one or combination of the decision-making modules may be detected and implemented based on the compatibility feature/data of application components. In an embodiment, one or combination of the decision-making modules may be detected and implemented based on the operating environment determined to be trusted via the computing trust factor of the compatibility feature/data. Based on the detected and implemented decision-making modules, the traffic packets may be authorized to process, reroute, select, and deselect the traffic packets, for execution on a corresponding operative environment that may be based on the trust factor/trusted feature.

In an embodiment, the baseband unit 104 may be coupled to the central unit 102 over Ethernet connection with 10G/25G communication speed and/or PCIe bus connection. The baseband unit 104 may be configured with any of OAP, VPX boards and combination thereof to detect traffic packets and feature of application components associated with the traffic packets to perform one or more operations via determining any of decision-making modules and/or combination of the decision-making modules which are described above for central unit 102. The baseband unit 104 may be configured with one or more processors 214 and/or MPSoCs 214 with a Linux kernel. In an embodiment, the one or more processors 214 may include, but are not limited to, radio transforms processors and programmable telemetry processors (PTP). The one or more processors 214 may include Intel processors and/or Versal processors. The one or more processors 214 may be communicatively connected to DDR memory 216 via one or more links listed above. In some embodiments, the one or more processors 214 may be communicatively connected to the FPGAs 218 via the one or more links which are same as the links mentioned above for central unit 102. For example, the one or more processors 214 may be connected to the FPGAs 218 over Ethernet connection with 100G speed and/or PCIe bus connection. In an embodiment, the FPGAs 218 may perform functions including, but are not limited to, layer 1 baseband, precoding, channel separation, PCIe DMA. In some embodiments, the FPGAs 218 may be configured to be Xilinx, Intel boards, queue DMA (QDMA), common public radio interface (eCPRI)/radio over Ethernet (ROE) Xilinx IP in Linux Kernel. In an embodiment, the FPGAs 218 may be communicatively coupled to the DDR 220.

In an embodiment, the DDR 216 and DDR 220 may be programmatically configured to manifest and store inventories of various application components, devices, boards, components, units, and other systems running its own application and protocol similar to the information stored in DDR 208 and 210 as described above for the central unit 102.

In an embodiment, the radio unit 106 may be coupled to the baseband unit 104 over eCPRI connection with 10G/25G communication speed. The radio unit 106 may be configured with an HSC 229 where any and all SoCs may be continuously monitoring memory and inline DDR encryption. In an embodiment, the radio unit 106 may be configured with a plurality of FPGAs (222, 226, 230) to detect traffic packets and feature of application components associated with the traffic packets to perform one or more operations via determining any of decision-making modules and/or combination of the decision-making modules which are described above for central unit 102. In an embodiment, FPGAs 222 may be configured to perform packet routing, beamforming, command and control (C&C) functions. In some embodiments, the FPGAs 222 may include, for example, Versal, MPSoC, radio frequency system-on-chip (RFSoC), Intel, and open radio access network (ORAN) IP in a Linux Kernel. The FPGAs 222 may be communicatively connected, via Serializer/Deserializer (SERDES) network, to the other FPGAs, for example, 226 and 230 that may be configured to be any of RFSoC and Intel and configured to act as digital front end and RF data converters. In an embodiment, each of the FPGAs (222, 226 and 230) may be communicatively coupled to DDR memories (224, 228 and 232). In an embodiment, the DDR memories (224, 228 and 232) may be programmatically configured to manifest and store inventories of various application components, devices, boards, components, units, and other systems running its own application and protocol similar to the information stored in DDR 208 and 210 as described above for the central unit 102.

In an embodiment, the HSC 200 architecture includes a plurality of user equipment (UE) (236, 238) that may be user endpoint devices. The UE (236, 238) may be workstations, personal computers, portable computer systems, handheld devices, mobile computing devices, FPGA/SoC boards, wearable devices, internetworking devices, autonomous or semi-autonomous devices, any other electronic device that incorporates hard-wired and/or program logic to implement the described techniques, one or more virtual computing machines or instances in a data center, and/or a network of server computers, any kind of computing device such as a desktop computer, computer system, computing system, laptop computer, tablet computer, mobile computing device, smartphone, personal computers, personal digital assistants (PDAs), laptops, or workstations, notebook, netbook, tablet computer, e-book reader, GPS device, camera, handheld electronic device, cellular telephone, smartphone, augmented/virtual reality (AR/VR) device, mixed reality (MR) device, other suitable electronic devices, or any suitable combination thereof. Throughout this disclosure, all references to "user" or "users" are specified for convenience but correspond to virtual keyboard generate application and/or the electronic device that execute the technical steps described in the disclosure. Thus, even where the terms "user" or "users" appear, all steps and functions of the disclosure are intended as computer-implemented steps or technical steps and not manual, mental, human-performed, or abstract steps, each of which is hereby expressly excluded from the scope of the claims and the disclosure. In some embodiments, the UE (236, and 238) may be communicatively coupled with radio unit 106 via the one or more links listed above. In an embodiment, the UE (236, and 238) may be configured with a plurality of FPGAs and/or processors or logics to perform any of decision-making modules and/or combination of the decision-making modules which are described above for central unit 102.

Figure 3:
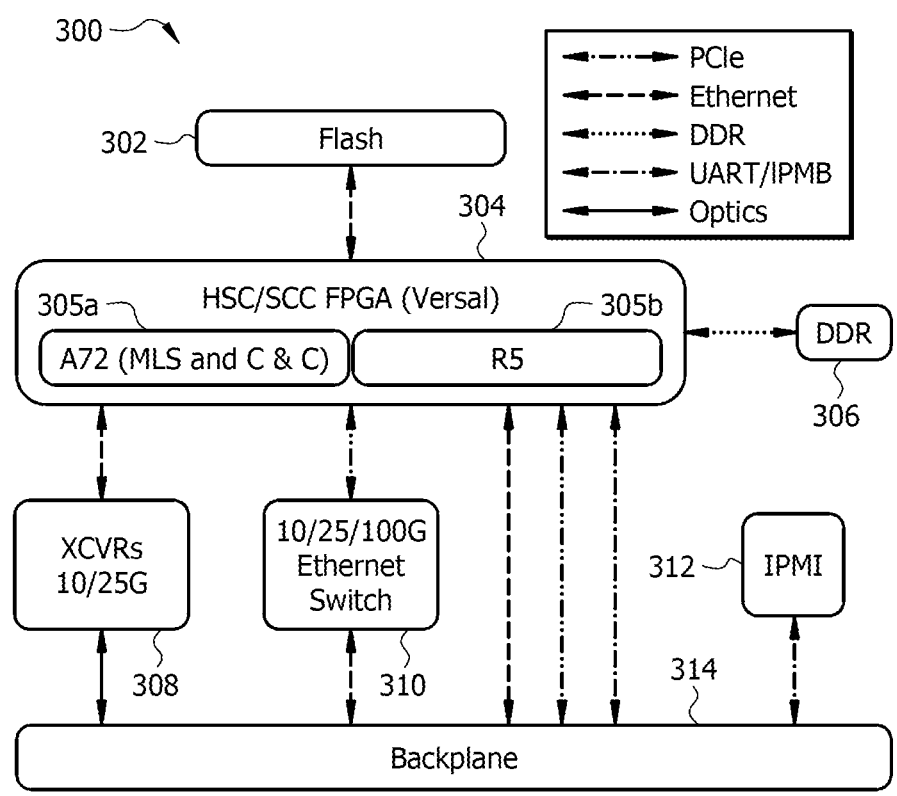
FIG. 3 illustrates an example architecture of a logical diagram of the HSC and its associated SSC (HSC/SSC), according to an embodiment.

FIG. 3 illustrates an example architecture 300 of logical diagram of the HSC 304 and its associated SSC (HSC/SSC) as it is deployed on the Xilinx Versal development board, according to an embodiment. The architecture 300 may use mixed-signal microcontroller (MSP430), or similar, for an intelligent platform management interface (IPMI) device to promote flexibility. In this manner, a specific VPX board may provide HSC/SSC FPGA (Versal) 304 as target hardware that may be tactically deployed and may be similar to planned development kits. The HSC/SSC FPGA (Versal) 304 may include secure RDMA and related components to run and implement various decision-making modules and functions to manage the traffic packets via performing various operations. In an embodiment, the Xilinx Versal development board in the architecture 300 may include the HSC/SSC FPGA (Versal) 304 that may include ARM processors and FPGA logic along with a switch to be controlled by software (SW) on ARMs. In some embodiments, the HSC/SSC FPGA (Versal) 304 may include two kinds of processors, for example, A72 processor 305a and R5 processor 305b. The two processors A72 305a and R5 processor 305b may be configured to process the HSC/SSC processing functions residing on the development board 300. In an embodiment, an A72 ARM core (A72 processor 305a) may be a general-purpose processing unit and configured to implement all the HSC/SSC multi-level security (MLS) and C&C processing functions. The R5 processor 305b may be a real-time processor, which is where all other processing by the HSC/SSC 304 occurs.

In an embodiment, the HSC/SSC FPGA (Versal) 304 may be coupled to a flash 302 that may be a flash (RAM) to boot the VPX board including the HSC/SSC FPGA (Versal) 304.

The HSC/SSC FPGA (Versal) 304 may be configured to communicate and configured with a dedicated DDR memory 306 that manifests and stores inventories of various application components, devices, boards, components, units, and other systems running its own application and protocol similar to the information stored in DDR 208 and 210 as described above for the central unit 102 for FIG. 2. The DDR memory 306 may be utilized by the HSC/SSC FPGA (Versal) 304.

In an embodiment, the VPX board shown by architecture 300 may be flexible in nature to provide a trusted switch along with other HSC/SSC FPGA (Versal) 304 capabilities for use in many 5G. MIL designs and deployments and the VPX board may act as a main component for all Ethernet based communications where the hardware may be based on 5G industry standard protocols. Existing systems associated with current HW do not use SSC/HSC integration points that implement the 5G stack and may face risks associated with resource constraining planned implementation when a layer of security is added onto the hardware or software components, which is overcome by the present disclosure. The architecture 300 design may include an industrial grade Ethernet switch 310 and conditionally 25G O/E transceivers 308. The transceivers 308 (XCVRs) with 10G/25G speed may the Xilinx IP core that handles the management of all of the 10G and 25G transceivers. The transceivers 308 may support optical communications between the HSC/SSC FPGA (Versal) 304 and the PCIe backplane 314 of the architecture 300 in which the VPX development board sits. This enables optical transmission to other devices across the PCIe backplane 314. In an embodiment, ruggedized 28G optical transceivers may be leveraged and fit HSC/SSC FPGA (Versal) 304, Ethernet switch 310, and transceivers 308 on same VPX board. The HSC/SSC FPGA (Versal) 304 and Ethernet switch 310 may be the targets for the HSC and SSC deployment. In an embodiment, the Ethernet switch 310 with speed 10G/25G/100G may be the Xilinx IP core that manages the physical ethernet connections and the switching fabric that permits wired ethernet communications between the HSC/SSC FPGA (Versal) 304 and other devices connected to the PCIe backplane 314. For example, the HSC/SSC FPGA (Versal) 304 may be communicatively coupled with a PCIe backplane 314 via 10G and 25G O/E transceivers 308 and/or 10G/25G/100G Ethernet switch 310. In an embodiment, the HSC/SSC FPGA (Versal) 304 communicates off-board with other single board user equipment, for example, computers and devices via the PCIe Backplane 314 that may enable communications bridge between multiple single board user equipment. The IPMI 312 may be the Xilinx IP that permits remote access to the development board from devices connected to the PCIe backplane 314. The IPMI 312 permits the ability to control and monitor devices on the board from another device. The functions of each of the components of architecture 300 are described with reference to FIG. 4 to process, reroute, select, and deselect the traffic packets based on various factors including, but not limited to, decision-making modules, compatible data/features of the application component, trust score and/or trust factor of the application component, ID of application component, type of application component, operating environment determined to be trusted for the application component and combination thereof.

Figure 4:
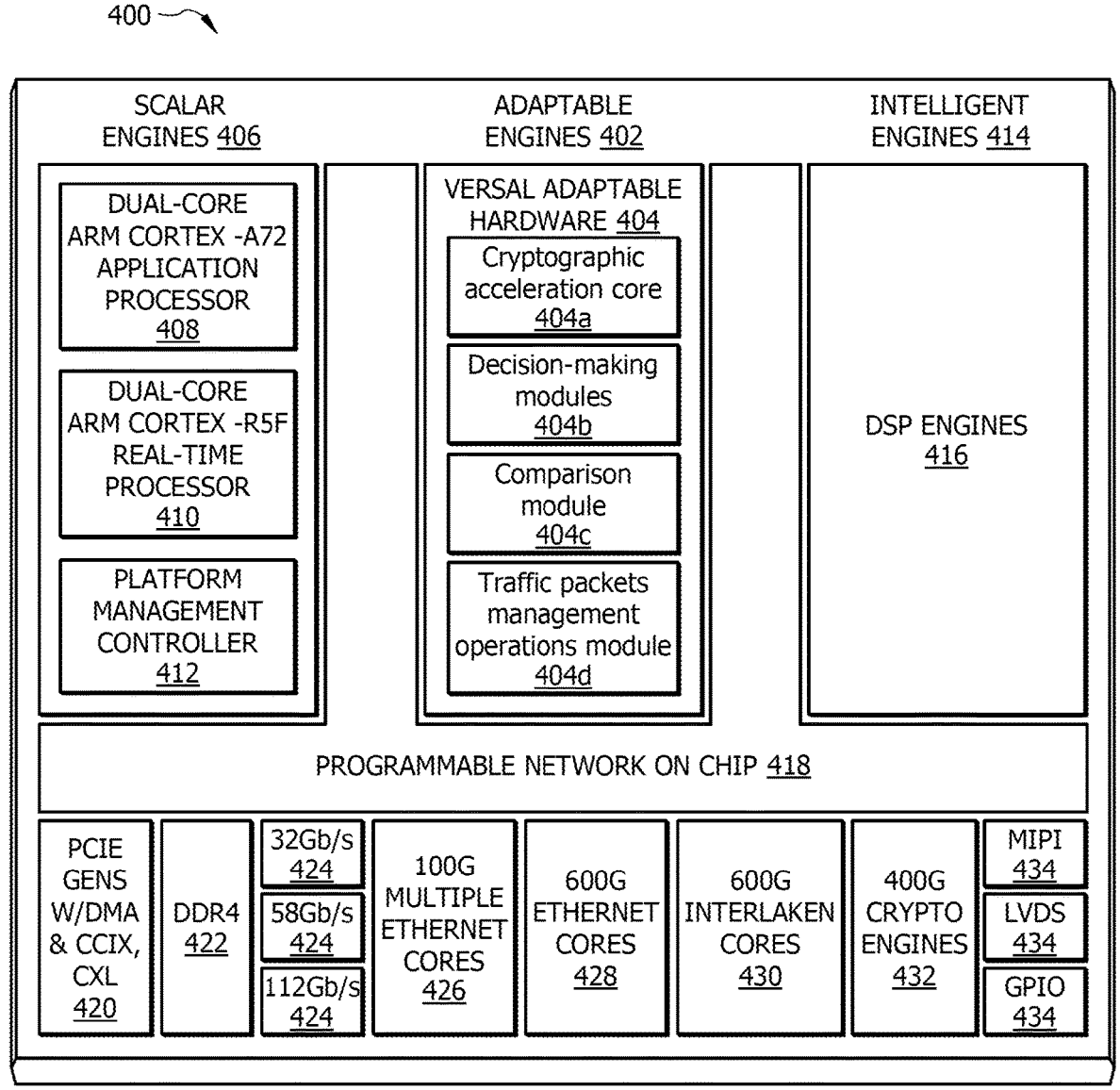
FIG. 4 illustrates an example of HSC/SSC FPGA (Versal) in the VPX board that may be configured with various logical IP cores, according to an embodiment.
Figure 5A:
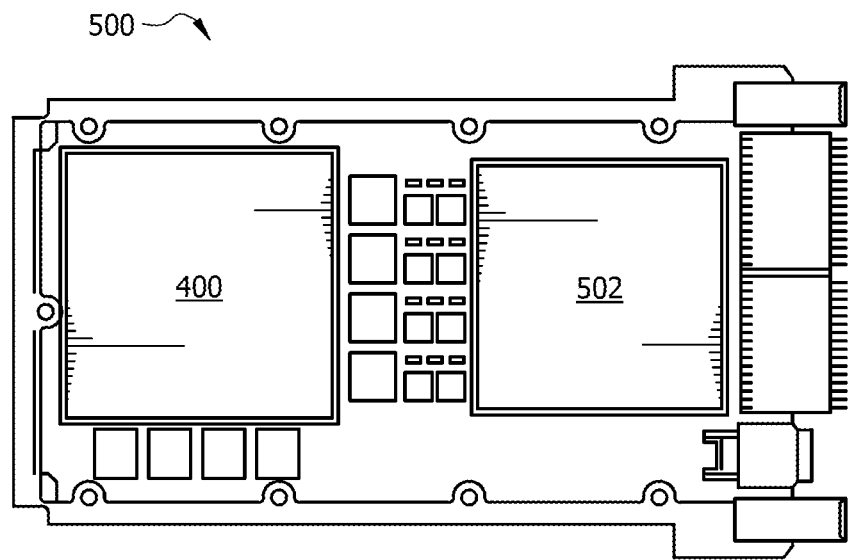
FIG. 5A and FIG. 5B illustrate the VPX board that may be configured with HSC/SSC FPGA (Versal) and Intel architecture, according to an embodiment.
Figure 5B:
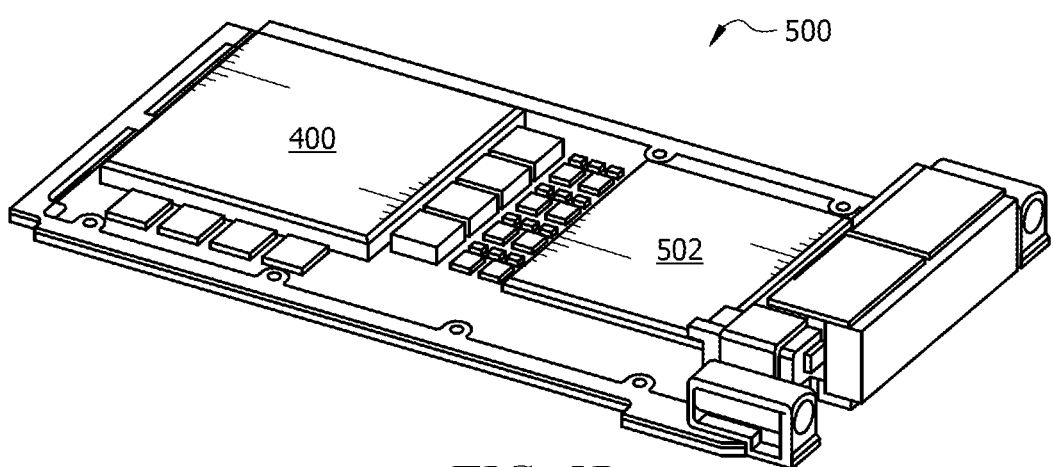

FIG. 4 illustrates an example of HSC/SSC FPGA (Versal) 400 in the VPX board that may be configured with various logical IP cores, according to an embodiment. FIG. 4 may show an example of Xilinx Versal breakout of logical IP hardware cores in the VPX board which is depicted in FIG. 5. FIG. 5 illustrates the VPX board 500 that may be configured with HSC/SSC FPGA (Versal) 400 and Intel architecture 502. In an embodiment, HSC/SSC FPGA (Versal) 400 and switch may use a large amount of top side of VPX board 500 that may fit on a single board. In FIG. 5, the VPX board 500 design shown with an optical connector may be built that may use a VPX P2 connector for additional SERDES lanes. The operation principles may be the same with or without the transceivers and data may flow in/out of the FPGA's data guard and then be routed by the switch.

Referring back to FIG. 4, the HSC/SSC FPGA (Versal) 400 configured with various IP cores including, but are not limited to, adaptable engines 402, scalar engines 406, intelligent engines 414 and programmable network on chip 418. In an embodiment, the HSC/SSC FPGA (Versal) 400 may be configured with secure RDMA (SERMA) Versal hardware core containing programmable logic mesh. The HSC/SSC FPGA (Versal) 400 may include components described in FIG. 2, and FIG. 3.

In an embodiment, the HSC/SSC FPGA (Versal) 400 may be configured with one or more memories, for example, flash 302 and DDR memory 306 (from FIG. 3) that may be operable to store a set of application components features of each application component of the plurality of application components. In some embodiments, the one or more memories of the HSC/SSC FPGA (Versal) 400 may be configured to store inventories of set of application components, for example, device identifier (ID), device name, type of application component associated with the device, functioning protocol of the application component, IP address of each application component, compatibility data/feature of the application component, executable instructions, information about trusted operative environment of each of the application components and other data related to operational and functionality of the application components that may be related to provide trusted operating environment information/data, compatibility and functioning/operative protocol of the application components. In an embodiment, the one or more memories of the HSC/SSC FPGA (Versal) 400 may be configured to store a routing table maintained for each of the set of plurality of components. The routing table may be configured to update itself based on results of the one or more operations (based on decision-making modules 404b, comparison module 404c traffic packets management operations module 404d and trusted switching module (not shown) that manages the traffic packets of each of the set of the plurality of application components. The one or more operations may include, but are not limited to, routing the traffic packets, re-routing the traffic packets, authorizing the traffic packets, archiving the traffic packets, canceling the traffic packets, discarding the traffic packets, selecting the traffic packets, deselecting the traffic packets for execution on a corresponding operative environment, and any combination thereof.

The adaptable engines 402 includes a Versal adaptable hardware 404 that may include various Versal hardware cores including, but not limited to, a cryptographic acceleration core 404a, decision-making modules 404b, comparison module 404c, and traffic packets management operations module 404d and trusted switching module (not shown) that maps to any of the decision-making modules 404b according to the traffic packets. In an embodiment, the cryptographic acceleration core 404a performs double encryption with cryptic keys for the traffic packets for transmitting the analyzed traffic packets through any of interfaces (420, 422, 424, 426, 428, 430, 432, and 434) of the programmable network on chip 418 to perform the one or more operations. In some embodiments, the cryptographic acceleration core 404a may be configured to perform decryption functions on the traffic packets that are received through any of the interfaces of the programmable network on chip 418.

The decision-making modules 404b may be configured to invoke and implement any of modules including, but not limited to, (a) trusted operating environment validation and monitoring module, (b) application and process whitelisting for various operating environments external to the operating environment of the platform module, (c) intrusion/anomaly detection and prevention (rule-based and machine learning (ML)/artificial intelligence (AI)-based) module, (d) encryption services for data-at-rest and data-in-transit (including quantum-resistant algorithms) module, (e) integration with security incident and event monitoring (SIEM) systems module and (f) trusted switching module.

In an embodiment, the trusted operating environment validation and monitoring module may be configured to ensure proper functioning of the Versal adaptable hardware 404 in its operating environment or operating system. The trusted operating environment validation and monitoring module may be configured to scan the operative environment for all connected hardware that may be connected over PCIe backplane of a single chassis and/or blade. After scanning the operative environment of all connected hardware, specific application component feature, for example, hardware information from each application component may be extracted, collected and/or determined. Some examples of application component features of application components may include, but are not limited to, device identifier (ID), MAC ID, firmware version, manufacturer, device name, type of application component associated with the device, functioning protocol of the application component, IP address of each application component, compatibility data/feature of the application component, executable instructions, information about trusted operative environment of each of the application components and other data related to operational and functionality of the application components that may be related to provide trusted operating environment, compatibility and functioning/operative protocol of the application components. After determining application component feature, a secure hash algorithm-256 (SHA-256) hash information of the determined application component feature may be created. The hash information may be written to the manifested inventories of the one or more memories of the HSC/SSC FPGA (Versal) 400. The manifested inventories may be signed with a digital signature and based on the digital signature, a log entry may be created with success or failure, to a log file accessible by an SSC logging server communicatively connected to the HSC of the application component. At boot time and at user-specified periods during runtime, the trusted operating environment validation and monitoring module conducts the same scan and calculates the SHA-256 hash information of each connected application component. The calculated data may be written to a temporary file. The digital signature may be validated on the manifested inventories. The hash information in the temporary file may be compared with the hash information stored in the inventories after the manifested inventories file is accessed. Based on the comparison, a log entry may be written with a mismatch data, matched data, alerts, warnings, prompts to a log file accessible by the SSC logging server.

In an embodiment, the application and process whitelisting for various operating environments external to the operating environment of the platform module may be configured to ensure that applications, executables, libraries, processes, and scripts in protected operating environments (for example, Linux, Windows, etc.) are not permitted to run unless specifically authorized by an authorized security administrator. In this way, spyware, malware, process injection attacks, worms, remote access Trojans, and other software and processes may be prevented that can cause compromise the protection of the system connecting all the application components. At deployment of the application and process whitelisting for various operating environments external to the operating environment of the platform module in the system, various steps may be performed. The first step may include scanning the operating environment of the application components and identifying all applications, executables, libraries, processes, and scripts executable or implementable by or compatible with the application component. Next step includes permitting the security administrator to select the authorized applications, executables, libraries, processes, and scripts compatible with the application component. A SHA-256 hash data of each application, executable, library, process, or script may be created using a key unique to the HSC of the application component, thereby binding it to the HSC of the application component. This may prevent unauthorized replacement of or removal of the HSC in order to bypass the whitelisting function. The hash data may be written to the manifested inventories file and signed with digital signature. A log entry with success or failure, etc. may be entered or written to a log file that may be accessible by the SSC logging server. At boot time, at user-definable periods during runtime, and at initial invocation of an application, executable, library, process or script, the application and process whitelisting for various operating environments external to the operating environment of the platform module may install a device driver to intercept all calls to the file system and identifies the location of the driver in memory, which is periodically checked (user-definable) to ensure the whitelisting function is not bypassed. If the driver is not present, then a log entry is written and the application component or the system may be halted until the driver is reinstalled and relaunched. A SHA-256 hash data of the application, executable, library, process, or script attempting to start may be calculated and written to a temporary file. The application and process whitelisting for various operating environments external to the operating environment of the platform module may validate the digital signature on the manifested inventories file. Upon opening the manifested inventories file, the hash data in the temporary file may be compared with the hash data stored in the manifested inventories file. Based on the comparison, a log entry may be written with mismatched information, warnings, etc. to a log file accessible by the SSC logging server. If a hash matches, the application, executable, library, process, or script may be allowed to execute. If a hash does not match, the application, executable, library, process, or script may not be permitted to launch.

In an embodiment, the intrusion/anomaly detection and prevention (rule-based and ML/AI-based) module may use a combination of open-source intrusion detection applications, for example, snort, and custom (Lockheed) ML/AI-based intrusion detection capabilities. In an embodiment, the intrusion detection/intrusion prevention system may be named as C-BIT. The intrusion/anomaly detection and prevention (rule-based and ML/AI-based) module may be trained on normal traffic in a sandboxed environment for each base station in which the HSC/SSC FPGA (Versal) 400 resides to learn a baseline of normal traffic. The intrusion/anomaly detection and prevention (rule-based and ML/AI-based) module may then be trained on known attack traffic generated by both automated tools and penetration testers to learn a baseline of known anomalous behavior. The module may then be run in a monitoring mode in an operational environment to further refine the training prior to being enabled in enforcement mode. All detected anomalies, a periodic keep-alive notification, and associated times are logged to a log file accessible by the SSC logging Server.

In an embodiment, the encryption services for data-at-rest and data-in-transit (including quantum-resistant algorithms) module may be configured as a federal information processing standards (FIPS) 140-2 and FIPS 140-3 compliant module that contains both the software libraries and hardware IP cores to support all encryption functions within the scope of the HSC/SSC of the associated application component. The encryption functions may include the creation of SHA-256 hashes, encrypting and decrypting of data stored in the one or more memories, and communication links. The encryption functions may be configured to implement a wide variety of symmetric and asymmetric encryption algorithms (both quantum-resistant and legacy). The encryption functions also provide a secure key store, performs all functions of key management to include key generation, key storage, key deletion, etc.

The SIEM systems module may be configured to use the SSC logging server to integrate with SIEM systems. The SSC logging server collects logs from each of the modules on a user-defined schedule. The module then converts them to either common event format (CEF) or system logging protocol (SYSLOG) format or custom formats (for example, comma delimited, etc.) and provides them on demand and periodically to the external SIEM system.

In an embodiment, the trusted switching module may be configured to utilize the hash manifest created by the trusted operating environment validation and monitoring module to identify the application components or devices connected to the HSC/SSC FPGA (Versal) 400 and the backplane. The trusted switching module creates a map of logical connections based on traffic types and device types, intercepts traffic on the backplane, verifies whether or not the two devices are permitted to connect with that traffic and then either permits the connection or to deny the connection. For example, video traffic from a video card or graphics processing unit (GPU) may be permitted to a monitor, but not to a printer. In an embodiment, the trusted switching module may apply, read, and enforce commercial internet protocol security option (CIPSO) headers for secure Ethernet connections between specific hardware Ethernet addresses and physical ports.

In an embodiment, one or a combination of the decision-making modules 404*b* may be detected and implemented based on the traffic packets received via any of the interfaces of the programmable network on chip 418 over PCIe bus connection. The traffic packets may be analyzed to determine compatibility feature/data of the associated application components (from and/or for which the traffic packets correspond to). In an embodiment, one or combination of the decision-making modules 404*b* may be detected and implemented based on the compatibility feature/data of application components. In an embodiment, one or a combination of the decision-making modules 404*b* may be detected and implemented based on the operating environment determined to be trusted via computing trust factor of the compatibility feature/data. Based on the detected and implemented decision-making modules 404*b*, the traffic packets may be authorized to process, reroute, select, and deselect the traffic packets, for execution on a corresponding operative environment that may be based on the trust factor/trusted feature.

In an embodiment, the comparison module 404*c* may be programmatically configured to compare the application component feature of each of the application components with the set of application components features. The comparison module 404*c* may be configured to compare a new executable application, associated with an application component, with an executable application associated with an application component feature in the set of application component features to determine compatibility of the new executable application.

In an embodiment, the traffic packets management operations module 404*d* may be programmatically configured to perform one or more operations for the trusted operative environment to manage the traffic packets of each of the set of the plurality of application components based on comparing the application component feature of each of the set of the plurality of application components with the set of application components features. The one or more operations may be performed for the new executable applications. The one or more operations may include, but are not limited to, routing the traffic packets, re-routing the traffic packets, authorizing the traffic packets, archiving the traffic packets, canceling the traffic packets, discarding the traffic packets, selecting the traffic packets, deselecting the traffic packets for execution on a corresponding operative environment, and any combination thereof.

The scalar engines 406 includes a plurality of processors (408, 410) that may be operably coupled with the one or more memories. The plurality of processors may include a dual-core ARM Cortex A72 application processor 408 and a dual-core ARM Cortex R5F real-time processor 410. The dual-core ARM Cortex A72 application processor 408 may be used for multiple listing service (MLS) and C&C processing of the HSC/SSC FPGA (Versal) 400. In an embodiment, the dual-core ARM Cortex A72 application processor 408 maps to the decision-making modules 404*b*. In some embodiments, the dual-core ARM Cortex A72 application processor 408 maps to the trusted operating environment validation and monitoring module, and the encryption services for data-at-rest and data-in-transit (including quantum-resistant algorithms) module. The dual-core ARM Cortex R5F real-time processor 410 may be configured to implement (a) the trusted operating environment validation and monitoring module, (b) application and process whitelisting for various operating environments external to the operating environment of the platform module, (c) intrusion/anomaly detection and prevention (rule-based and machine learning (ML)/artificial intelligence (AI)-based) module, (d) encryption services for data-at-rest and data-in-transit (including quantum-resistant algorithms) module, (e) integration with security incident and event monitoring (SIEM) systems module and (f) trusted switching module.

In an embodiment, the dual-core ARM Cortex R5F real-time processor 410 may be configured to manage proper implementation of application processor 408. For example, the dual-core ARM Cortex R5F real-time processor 410 may monitor whether the application processor 408 is able to perform the one or more steps. The application processor 408 may be configured to receive traffic packets from a set of the plurality of application components coupled to the HSC/SSC FPGA (Versal) 400. The application processor 408 may be configured to inspect the traffic packets of the set of the plurality of application components to determine an application component feature of each of the application components in the set of the plurality of application components. The application processor 408 may be configured to compare the application component feature of each of the application components with the set of application components features and perform one or more operations to manage the traffic packets of each of the set of the plurality of application components based on comparing the application component feature of each of the set of the plurality of application components with the set of application components features. The application processor 408 may be configured to update the routing table for each of the set of plurality of components based on performing the one or more operations to manage the traffic packets of each of the set of the plurality of application components. In an embodiment, the application processor 408 may be configured to determine, from the application component feature of each of the set of plurality of application components, component type, component functioning protocol and component compatibility data, to determine an operative environment for an application component in the set of plurality of application components based on the component type, the component functioning protocol and the component compatibility data associated with the application component in the set of plurality of application components. The application processor 408 may be configured to identify a trusted operative environment for the application component and re-route the traffic packets of the application component of the set of plurality of application components to authorize the traffic packets of the application component to the trusted operative environment. The application processor 408 may be configured to determine, from the traffic packets, a new executable application received from a computing device. The application processor 408 performs comparison of the new executable application with the executable application of the application component feature in the set of application component features to determine a compatibility of the new executable application and performs authorizing, based on the compatibility of the new executable application, the traffic packets run on an operative environment that is compatible with the new executable application. Based on any operation, decision-making module 404*b*, and other actions, the routing table may be updated.

The platform management controller may be utilized to remotely connect to the VPX board and manages it. This ensures synching the functioning of the plurality of processors (408 and 410) with each of the application components on the PCIe bus connection or PCIe backplane 314 (in FIG. 3).

The intelligent engines 414 includes a digital signal processor (DSP) engines 416 may be utilized used for AI and ML functions of the intrusion/anomaly detection and prevention (rule-based and ML/AI-based) module.

The programmable network on chip 418 includes various IP cores including, but are not limited to, PCIE GENS W/DMA & CCIX (cache coherent interconnect for accelerators), CXL (computer express link) 420, DDR4 memory 422, traffic packets connections with speed 32 Gb/s, 58 Gb/s and 112 Gb/s indicated as 424, Ethernet cores (100G) 428, Interlaken cores (600G) 430, crypto engines (400G) 432, and MIPI, lattice semiconductor DC-SCM (LVDS) (data-center-ready secure control module-DC-SCM) and general purpose input/output (GPIO) cores 434. The traffic packets from different user equipment, application components and devices may be received into the HSC/SSC FPGA (Versal) 400 via any of the cores (420, 422, 424, 426, 428, 432, 434). In some embodiments, the FPGA component (400) may pin out several SERDES lanes from FPGA (400) to the PCIe backplane (314) to enable a variety of communications, for example, PCIs, more Ethernet, etc., and set up connectivity and test based on the commercial switch. The cores (420, 422, 424, 426, 428, 432, 434) may be a number of Xilinx-provided IP cores utilized for connectivity to the PCIe backplane 314 and other single-board computers (SBC).

These IP cores (420, 422, 424, 426, 428, 432, 434) may be used to perform basic communications and encryption acceleration functions.

Figure 6:
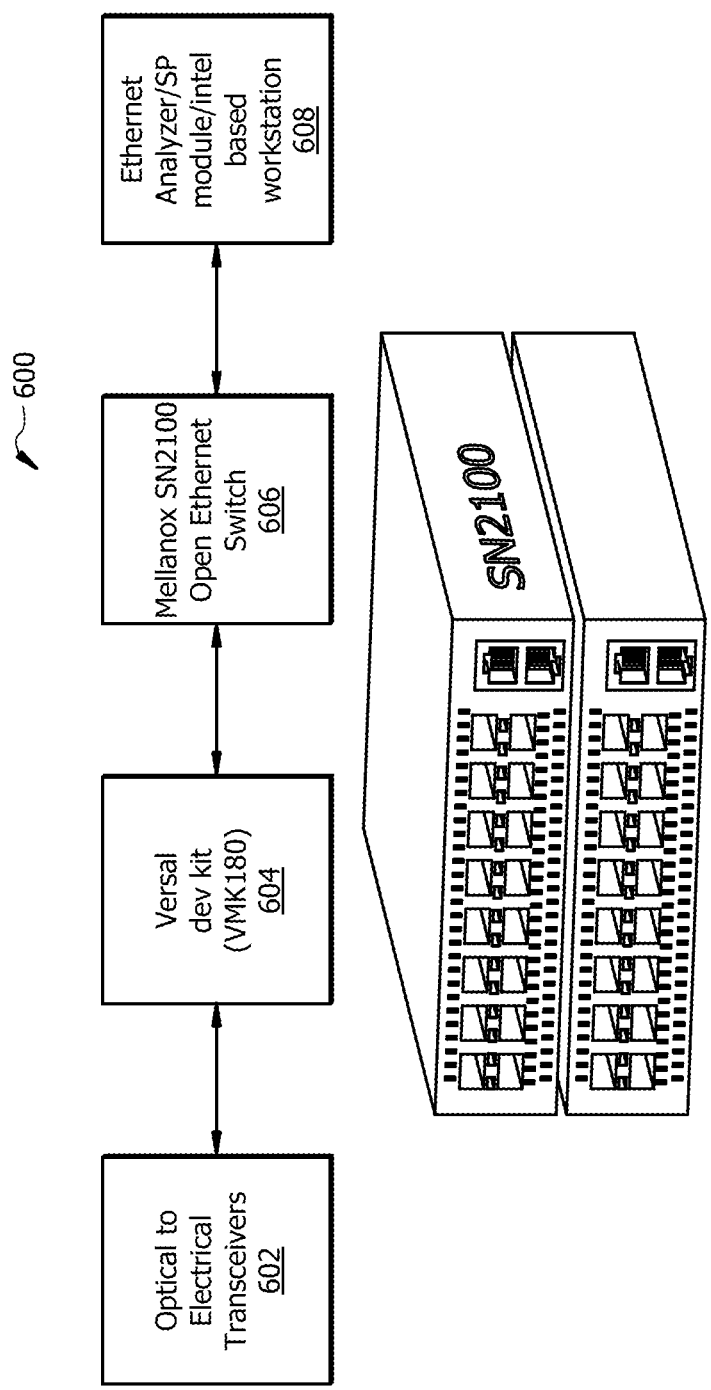
FIG. 6 illustrates an example of Xilinx Versal development board, according to an embodiment.

FIG. 6 illustrates an example of Xilinx Versal development board 600 with Mellanox SN2100 Ethernet switch 606 serving as the backplane, thereby permitting to test of throughput, accuracy, and other functions of the HSC/SSC FPGA (Versal) 400. In an embodiment, optical interconnections as well as wired Ethernet connections may be used to connect with the application components. As shown in FIG. 6, optical to electrical transceivers 602, Versal dev kit (VMK180) 604, Mellanox SN2100 open Ethernet switch 606, and Ethernet analyzer/SP module/Intel-based workstation 608 may be utilized in the Xilinx Versal development board 600. In an embodiment, the target hardware built for HSC and SSC may allow deployment of desired software applications and FPGA that does not have to be worked in around standard 5G capabilities. In an embodiment, flexibility of a commercial switch and FPGA may allow the target hardware HSC and SSC to be used across multiple platforms, which may be used with better feasibility across many platforms and programs.

Figure 7:
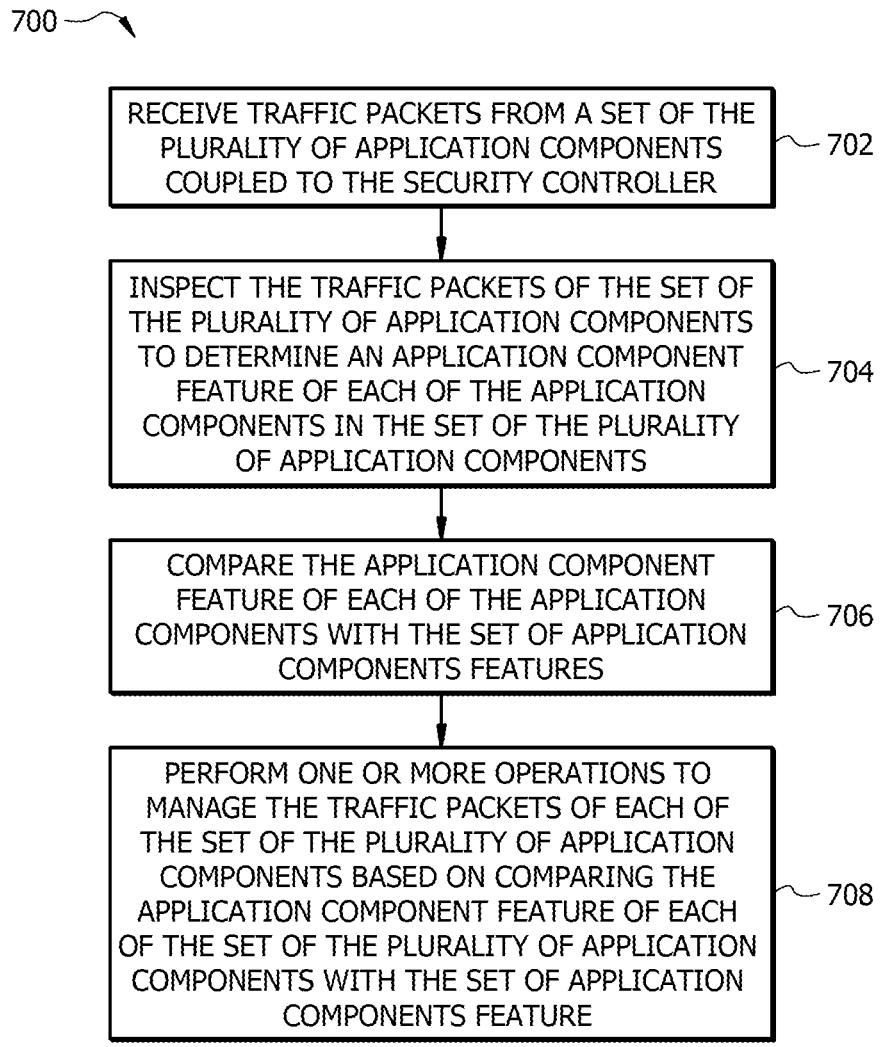
FIG. 7 depicts an example flowchart illustrating a method for managing traffic packets of application components, according to an embodiment.

FIG. 7 depicts an example flowchart 700 illustrating a method for managing traffic packets of application components, according to an embodiment. The method may be performed by the security controller, which may be the HSC/SSC FPGA (Versal) 400/304 (FIG. 3) that may be configured in a single-board computer system-on-chip (SoC) configuration in the FPGA system, FPGA board, FPGA-connected platform, etc. The security controller 400 may be any hardware security controller and a software security controller. The security controller 400 may be coupled to the plurality of application components. In an embodiment, the plurality of application components may include different devices, executable software applications, executable instructions, boards, peripheral controller interconnect express (PCIe) connected devices, computing devices, application components, and systems that may run and implement different application-specific protocols and functions. The plurality of application components may be part of the same chassis, or board, for example, FPGA board. In an embodiment, each application component of the plurality of application components may be connected to the security controller 400 over the PCIe backplane 314. In an embodiment, the security control 400 may include one or more memories and a plurality of processors. The one or more memories operably configured to store a set of application components features of each application component of the plurality of application components, during installation. The set of application component features include, but are not limited to, a type, functioning protocol, compatibility feature, device ID, device name, type of application component associated with the device, functioning protocol of the application component, IP address of each application component, compatibility data/feature of the application component, executable instructions, information about the trusted operative environment of each of the application components and other data related to operational and functionality of the application components that may be related to providing trusted operating environment information/data, compatibility data, and functioning/operative protocol of the application components. In an embodiment, each application component features of each application component may be stored in the inventories of the one or more memories and/or DDR memory 306. Each application component feature of each of the plurality of application components is different.

The plurality of processors (408, 410) may be operably coupled with the one or more memories, and the application processor 408 may be configured to perform one or more steps.

The method begins at step 702 to receive, by the processors (408, 410), the traffic packets from a set of the plurality of application components which may be different or same as the plurality of application components whose application component features may be stored in the inventories and coupled to the security controller 400.

At step 704, the traffic packets of the set of the plurality of application components may be inspected to determine an application component feature of each of the application components in the set of the plurality of application components. The application component feature may include the features stored in the inventories.

At step 706, the application component feature of each of the application components may be compared with the set of application components features in the inventories. In an embodiment, a decision check may be performed to determine whether the application component feature of each of the application components matches, does not match, is relative, and/or matches with a subset of features of the set of application components features in the inventories. The method stops if there is no match.

At step 708, one or more operations may be performed when the application component feature of each of the application components may be matched with or is relative to, or matches with the subset of the set of application components features in the inventories to manage the traffic packets of each of the set of the plurality of application components, that may be based on comparing the application component feature of each of the set of the plurality of application components with the set of application components features. The one or more operations may include, but are not limited to, routing the traffic packets, re-routing the traffic packets, authorizing the traffic packets, archiving the traffic packets, canceling the traffic packets, discarding the traffic packets, selecting the traffic packets, deselecting the traffic packets for execution on a corresponding operative environment, and any combination thereof. In an embodiment, the routing table may be configured to update itself based on results of the one or more operations (based on decision-making modules 404b, comparison module 404c, traffic packets management operations module 404d, and trusted switching module (not shown) that manages the traffic packets of each of the set of the plurality of application components.

In some embodiments, the processors (408, 410) may be configured to re-route the traffic packets to a trusted operative environment. The processors (408, 410) determine, from the application component feature of each of the set of plurality of application components, component type, component functioning protocol, and component compatibility data. An operative environment for an application component in the set of plurality of application components may be determined based on the component type, the component functioning protocol, and the component compatibility data associated with the application component in the set of plurality of application components. The processors (408, 410) identify a trusted operative environment for the application component. Next, the processors (408, 410) re-route the traffic packets of the application component of the set of plurality of application components to authorize the traffic packets of the application component to the trusted operative environment.

In some embodiments, the application component feature in the set of application components features may be associated with an executable application. The processors (408, 410) may be configured to determine, from the traffic packets, a new executable application received from a computing device connected over the PCIe bus connection/backplane 314. The processors (408, 410) compare the new executable application with the executable application of the application component feature in the set of application component features to determine a compatibility of the new executable application and authorize, based on the compatibility of the new executable application, the traffic packets to run on an operative environment that is compatible with the new executable application.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
  a security controller coupled to a plurality of application components, and comprising:
    one or more memories operable to store a set of application components features of each application component of the plurality of application components,
    a plurality of processors, operably coupled with the one or more memories, and a processor of the plurality of processors configured to:
      receive traffic packets from a set of the plurality of application components coupled to the security controller;
      inspect the traffic packets of the set of the plurality of application components to determine an application component feature of each of the application components in the set of the plurality of application components;
      compare the application component feature of each of the application components with the set of application components features; and
      perform one or more operations to manage the traffic packets of each of the set of the plurality of application components based on comparing the application component feature of each of the set of the plurality of application components with the set of application components features, wherein the application component feature in the set of application components features is associated with an executable application; and
    the processor is further configured to:
      determine, from the traffic packets, a new executable application received from a computing device;
      compare the new executable application with the executable application of the application component feature in the set of application component features to determine a compatibility of the new executable application; and
      authorize, based on the compatibility of the new executable application, the traffic packets to run on an operative environment that is compatible with the new executable application.

2. The system of claim 1, wherein the security controller comprises any of a hardware security controller and a software security controller.

3. The system of claim 1, wherein the security controller is a single-board computer system on chip configuration in a field programmable gate array (FPGA).

4. The system of claim 1, wherein the one or more operations comprises any of routing the traffic packets, re-routing the traffic packets, selecting the traffic packets, and deselecting the traffic packets for execution on a corresponding operative environment.

5. The system of claim 4, wherein the security controller further comprises a routing table maintained for each of the set of plurality of application components, wherein the routing table is updated based on performing the one or more operations to manage the traffic packets of each of the set of the plurality of application components.

6. The system of claim 5, wherein an application component feature in the set of application components features is associated with any of a type, functioning protocol and compatibility feature, and the application component feature of each of the plurality of application components is different; and
  the processor is configured to:
    determine, from the application component feature of each of the set of plurality of application components, component type, component functioning protocol and component compatibility data, wherein an operative environment for an application component in the set of plurality of application components is determined based on the component type, the component functioning protocol and the component compatibility data associated with the application component in the set of plurality of application components;

identify a trusted operative environment for the application component; and re-route the traffic packets of the application component of the set of plurality of application components to authorize the traffic packets of the application component to the trusted operative environment.

7. A computer-implemented method executed by a system, the method comprising:

receiving, by a processor of a security controller of the system, traffic packets from a set of a plurality of application components coupled to the security controller, wherein:

the security controller is coupled to a plurality of application components, and comprising:

one or more memory operable to store a set of application components features of each application component of the plurality of application components, inspecting, by the processor, the traffic packets of the set of plurality of application components to determine an application component feature of each of the application components in the set of plurality of application components;

comparing, by the processor, the application component feature of each of the application components with the set of application components features; and performing, by the processor, one or more operations to manage the traffic packets of each of the set of plurality of application components based on comparing the application component feature of each of the set of plurality of application components with the set of application components, features, wherein the application component feature in the set of application components features is associated with an executable application;

determining, from the traffic packets, a new executable application received from a computing device;

comparing the new executable application with the executable application of the application component feature in the set of application component features to determine a compatibility of the new executable application; and authorizing, based on the compatibility of the new executable application, the traffic packets to run on an operative environment that is compatible with the new executable application.

8. The computer-implemented method of claim 7, wherein:

the security controller comprises any of hardware security controller and a software security controller.

9. The computer-implemented method of claim 7, wherein:

the security controller is a single-board computer system on chip configuration.

10. The computer-implemented method of claim 7, wherein:

the one or more operations comprises any of routing the traffic packets, re-routing the traffic packets, selecting the traffic packets, and deselecting the traffic packets for execution on a corresponding operative environment.

11. The computer-implemented method of claim 10, wherein:

the security controller further comprising a routing table maintained for each of the plurality of application components, and the method further comprising:

updating the routing table based on performing the one or more operations to manage the traffic packets of each of the set of the plurality of application components.

12. The computer-implemented method of claim 11, wherein:

an application component feature in the set of application components features is associated with any of a type, functioning protocol and compatibility feature, and the application component feature of each of the application components is different; and the method further comprising:

determining, from the application component feature of each of the set of plurality of application components, component type, component functioning protocol and component compatibility data, wherein an operative environment for an application component is determined based on the component type, the component functioning protocol and the component compatibility data associated with the application component in the set of plurality of application components;

identifying a trusted operative environment for the application component; and re-routing the traffic packets of the application component of the set of plurality of application component to authorize the traffic packets of the application component to the trusted operative environment.

13. A non-transitory computer-readable medium storing instructions that when executed by a processor cause the processor to:

receive traffic packets from a set of plurality of application components coupled to a security controller, wherein:

the security controller is coupled to a plurality of application components, and comprising:

one or more memory operable to store a set of application components features of each application component of the plurality of application components, inspect the traffic packets of the set of the plurality of application components to determine an application component feature of each of the application components in the set of the plurality of application components;

compare the application component feature of each of the plurality of application components with the set of application components features; and perform one or more operations to manage the traffic packets of each of the set of the plurality of application components based on comparing the application component feature of each of the set of the plurality of application components with the set of application components, features, wherein the application component feature in the set of application components features is associated with an executable application;

determine, from the traffic packets, a new executable application received from a computing device;

compare the new executable application with the executable application of the application component feature in the set of application component features to determine a compatibility of the new executable application; and authorize, based on the compatibility of the new executable application, the traffic packets to run on an operative environment that is compatible with the new executable application.

14. The non-transitory computer-readable medium of claim 13, wherein the one or more operations comprises any of routing the traffic packets, re-routing the traffic packets, selecting the traffic packets, and deselecting the traffic packets for execution on a corresponding operative environment.

15. The non-transitory computer-readable medium of claim 14, wherein:

the security controller further comprising a routing table maintained for each of the plurality of application components, wherein the instructions further cause the processor to:
update the routing table based on performing the one or more operations to manage the traffic packets of each of the set of the plurality of application components.

16. The non-transitory computer-readable medium of claim 15, wherein:

an application component feature in the set of application components features is associated with any of a type, functioning protocol and compatibility feature, and the application component feature of each of the plurality of application components is different; and wherein the instructions further cause the processor to:
determine, from the application component feature of each of the set of plurality of application components, component type, component functioning protocol and component compatibility data, wherein an operative environment for an application component in the set of plurality of application components is determined based on the component type, the component functioning protocol and the component compatibility data associated with the application component in the set of plurality of application components;

identify a trusted operative environment for the application component; and re-route the traffic packets of the application component of the set of plurality of application components to authorize the traffic packets of the application component to the trusted operative environment.

17. The non-transitory computer-readable medium of claim 13, wherein:

the security controller comprises any of hardware security controller and a software security controller.

* * * * *